P. E. G. CUMBERLAND.
METHOD OF PREVENTING CORROSION OF METALS IMMERSED IN LIQUIDS.
APPLICATION FILED JUNE 13, 1907.
921,641.
Patented May 11, 1909.
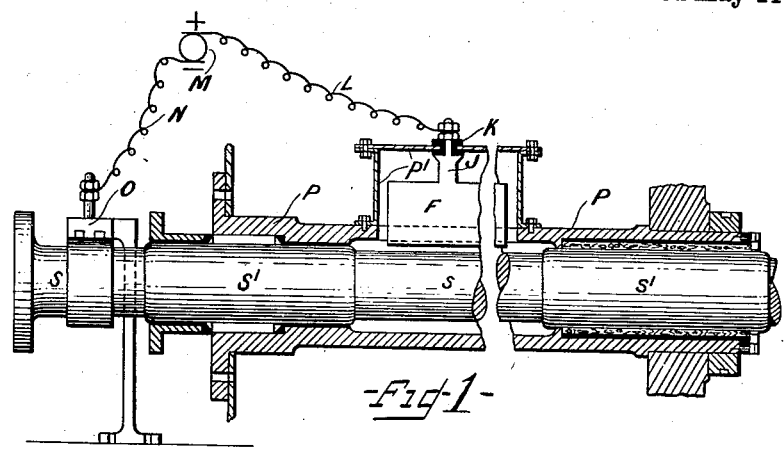
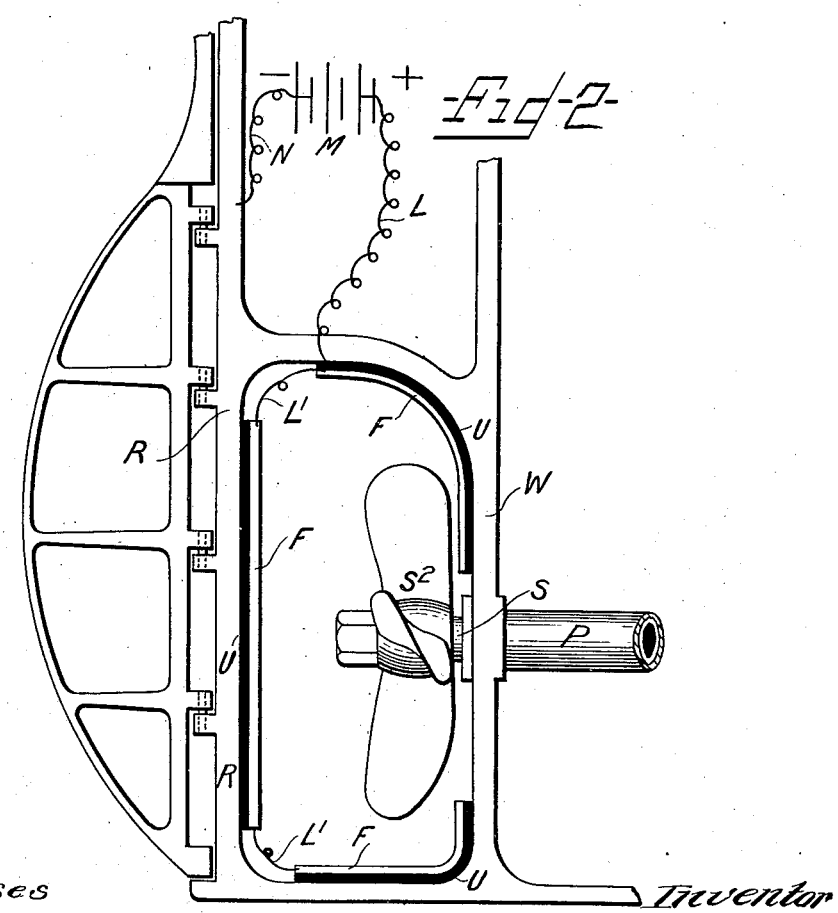

UNITED STATES PATENT OFFICE.

PEREGRINE ELLIOTT GLOUCESTER CUMBERLAND, OF ST. KILDA, VICTORIA, AUSTRALIA.

METHOD OF PREVENTING CORROSION OF METALS IMMERSED IN LIQUIDS.

No. 921,641.  Specification of Letters Patent.  Patented May 11, 1909.

Application filed June 13, 1907. Serial No. 378,826.

*To all whom it may concern:*

Be it known that I, PEREGRINE ELLIOTT GLOUCESTER CUMBERLAND, a subject of the King of Great Britain, residing at 85 Barkly street, St. Kilda, in the State of Victoria, Commonwealth of Australia, inventor, have invented certain new and useful Improvements in Methods of Preventing Corrosion of Metals Immersed in Liquids, of which the following is a specification.

This invention relates to an improved method of preventing the corrosion and decomposition of propeller shafts, stern posts and other parts of vessels immersed in or in contact with sea water in which two or more electrically opposed metals are placed in juxtaposition, thereby causing an electro-chemical action.

If pieces of two different metals or the same metal in different conditions be immersed in water containing any chemical salt in solution, or any other electrolyte differences of electric potential are found to exist between the said metals, if the metals are in electrical connection, currents are set up in consequence of the potential differences and at the same time one of the metals, that which is electro-positive with respect to the other, dissolves in the liquid or corrodes at a rate proportional to the current which flows.

It has been found that if the metals now subject to corrosion are in metallic contact, corrosion or solution may be prevented by the insertion in the liquid of auxiliary pieces of metal which are made electro-positive with respect to the said original metals and are insulated from the same except through the medium of the liquid. The original metals being in parallel then constitute the negative electrode and the auxiliary pieces of metal, being also in parallel, constitute the positive electrode. The auxiliary metals will therefore dissolve proportional to the current in the circuit which may be regulated to any extent required.

It is well known that metals immersed in water or other liquid and particularly in sea water are subjected to corrosion and decomposition owing to electro-chemical action. This has been made apparent by the fact that propeller shafts and other portions of steam ships are subjected to considerable corrosion through electro-chemical action generated between the iron of the shaft and the copper of the brass liners, and between the iron of the framework and the propeller blades, and pieces of zinc have been placed in juxtaposition to nullify the same.

The object of my invention is to provide a simple method whereby this electro-chemical action is nullified and the consequent corrosion and decomposition avoided in a cheaper and more effective manner than by the employment of zinc as heretofore. I accomplish this object by providing an auxiliary source of electric current and also by using an auxiliary metal plate or plates immersed, or partly immersed, in the sea water, such auxiliary plates being connected to the positive pole of the said auxiliary source of electric current, the negative pole being connected to the metal or metals to be protected. These auxiliary plates are insulated from the metals to be protected except through the medium of the water, and the auxiliary current aforesaid is equal to or of higher E. M. F. than that caused by the differences of potential between the metals to be protected.

In the accompanying drawings my invention is shown in Figure 1 as applied to the stern tube and tail shaft of a steam ship of well known construction. Fig. 2 shows my invention as applied to the rudder post and stern frame of a steam ship.

In Fig. 1 the stern tube is designated by the letter P, the tail shaft by the letter S, and the ordinary brass liners by the letter S'. The bearings and other portions of this stern tube and tail shaft are well known and are not therefore now described, the shaft S being allowed to run in water within the stern tube P, lignum vitæ bearings being provided for the purpose. In applying my invention I cut a hole or slot in the stern tube P and surmount the same by a hood or bonnet P', the same being securely fixed to the stern tube forming a secure and water-tight joint. Within this hood or bonnet P' I provide one or more auxiliary plates or electrodes F preferably of iron having a connecting rod or extension J passing through an insulating plug K within the top of the hood or bonnet P'. This auxiliary plate or electrode F is connected by means of the wire L to the positive pole of the source of electrical energy designated herein by the letter M. The other or negative pole of the said source of electrical energy M is connected to the shaft S by the connecting wire N, preferably through the medium of a contact brush O bearing on the said shaft or in any other convenient way, say by "earthing" the hull of the ship itself. The auxiliary electrode or plate F is well insulated from the metal parts surrounding it except through the medium of the water, and for that purpose, if necessary, insulating studs of porcelain or other non-conducting material may be provided.
In practice this source of electrical energy may consist of a dynamo or batteries and a continuous current is maintained throughout the circuit of equal or higher E. M. F. than that caused by the differences of potential between the metals to be protected. The iron of the shaft and the copper of the brass liners and other metals comprising the structure are brought into parallel instead of being opposed electrically and constitute the negative electrode of the auxiliary electrical circuit. These metals are thus protected from corrosion or decomposition and the corrosion is confined to the auxiliary plates F which constitute the positive electrodes. These plates or electrodes F are easily renewable from time to time and the steel shaft is thus protected.

In Fig. 2 my invention is shown as applied to the rudder post and stern frame of a steam ship. The stern tube is here designated by the letter P, the stern post by the letter W and the rudder post by the letter R. In applying my invention I provide a number of auxiliary plates or electrodes F, preferably of iron, arranged in convenient positions or preferably at about the same positions as now occupied by the zinc plates. In the accompanying drawings the auxiliary plates F are shown as arranged upon the inside of the rudder post R and also along the stern post W. As with the previously described application of my invention these plates must be well insulated from the other metals of the structure except through the medium of the water, and for this purpose are provided with an insulating packing, such as U. In practice these plates may be supported in any convenient way, such as by providing a recessed framework of wood or other insulating material into which the said plates are let in and affixed. These plates F are connected by means of a connecting wire L to the positive pole of a source of electric energy herein designated as M. These plates F are shown diagrammatically as connected to the source of electrical energy by the wire L and also as connected to each other by the wires L', but it will be understood that such connections are arranged in such a way as will best adapt itself to the particular circumstances. The negative pole of this source of electric energy M is connected to the portions of the vessel to be protected by means of the return wires N, or the same purpose may be effected by simply "earthing" the hull of the ship.

Having thus fully described the invention, what is claimed as new, is:

The method of preventing the corrosion and decomposition of propeller shafts and other metallic portions of ships immersed or in contact with sea water and whereby two or more electrically opposed metals are in juxtaposition and connected in parallel and constitute a negative electrode, consisting in placing additional iron means in contact with the water in proximity to the metal parts to be protected and insulating said iron means from said parts except through the sea water, and connecting said metal means in parallel and to the positive pole of an auxiliary source of electrical energy having a higher E. M. F. than that caused by the difference of electric potential between the various metals comprised in the structure to be protected, and connecting the negative pole of said source of energy and said metals to be protected constituting the negative electrode.

In testimony whereof I have hereunto set my hand in presence of two subscribing witnesses.

PEREGRINE ELLIOTT GLOUCESTER CUMBERLAND.

Witnesses:
    CLEMENT ALFRED HACK,
    BASIL PARKINSON.